UNITED STATES PATENT OFFICE 2,104,855

POLYMETHINE DYES

Walter Dieterle, Dessau-Ziebigk in Anhalt, and Karl Horst, Hofheim/Taunus, Germany, assignors to Agfa Ansco Corporation, Binghamton, N. Y., a corporation of New York No Drawing. Application September 18, 1933, Serial No. 689,974. In Germany September 23, 1932

4 Claims.  (Cl. 260—44)

Our present invention relates to polymethine dyes and more particularly to sensitizing photographic silver-halide emulsions.

One of its objects is to provide new polymethine dyes which are derived from tetrahydronaphthothiazole. Further objects will be seen from the detailed specification following hereafter.

We have found that valuable silver halide emulsions may be obtained by incorporation of cyanine and styryl dyestuffs which are derived from tetrahydronaphthothiazoles and their substitution products.

The hydrated naphthothiocarbocyanines show the good sensitizing power for ammonia emulsions which is a peculiar property of the naphthothiocarbocyanines, the maximum of sensitization and, in consequence, the region of sensitization is, however, by these cyanines displaced towards the region of shorter waves of the spectrum. This is desirable for many a problem in the emulsion technique. Thus, there are obtained dyestuffs which sensitize ammonia emulsions for that region of the spectrum, for which hitherto only the benzthiocarbocyanines were suitable.

This group of dyestuffs is characterized by the following general formulae

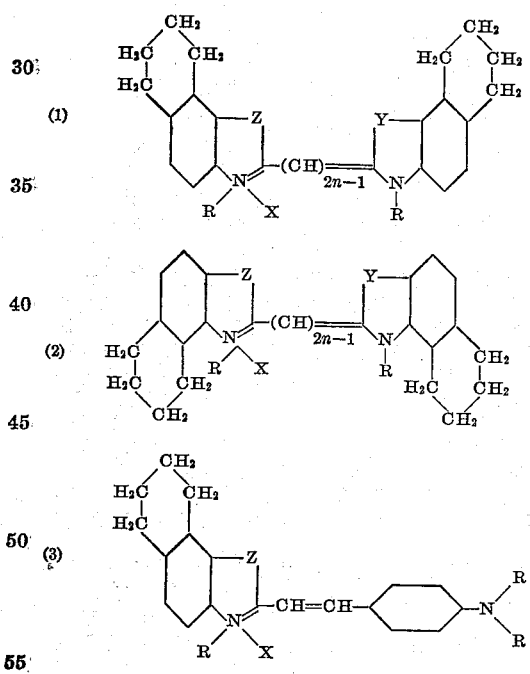

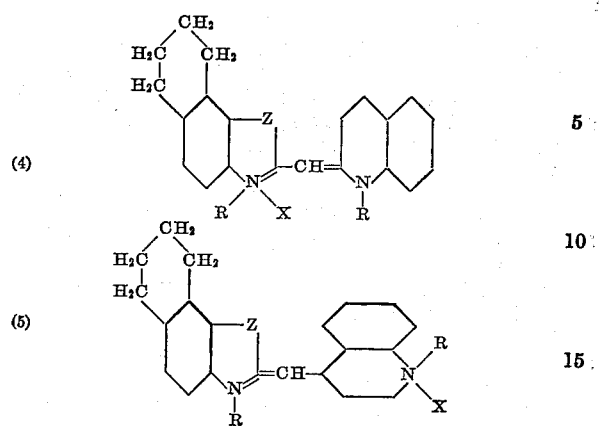

In these formulae

Y and Z stand for O, S, Se, —CH=CH or

(wherein R' and R'' stand for alkyl and aryl),

R stands for alkyl,

X stands for Cl, Br, I, SO$_4$CH$_3$, ClO$_4$ or another suitable acid radical, $n$ stands for 1, 2, 3 or 4.

The dyestuffs may be prepared according to known methods, for instance, by condensing a 2 - methyl - 4.5-tetrahydrobenzobenzthiazole - alkylhalide with the ester of an ortho-carboxylic acid. When using an ester of ortho-acetic acid or an ortho-ester of a higher fatty acid, dyestuffs are obtained which are substituted at the central carbon atom of the trimethenyl chain by an alkyl group. The dyestuffs of the kind indicated by the general Formula (3) may be obtained in known manner by condensing a quaternary salt of a heterocyclic base containing a tetrahydronaphthalene nucleus, with p-dimethylaminobenzaldehyde.

For preparing thiopseudocyanines, for instance, a 2-methyltetrahydronaphthothiazole is condensed with 2-iodoquinolinemethiodide in the presence of sodium ethylate.

By condensing a 2-methyltetrahydronaphthothiazole with quinoline-ethiodide in the presence of an alcoholic solution of sodium hydroxide, the tetrahydronaphthothioisocyanine is obtained.

The benzene nucleus linked to the thiazole nucleus may, if required, be substituted in its positions still holding hydrogen by halogen or alkyl, aryl, or alkoxy groups.

The preparation of the bases is analogous to known methods.

The dyes are obtainable according to the desired solubility in form of the bromide, iodide, perchlorate etc. and are used in a quantity as usual for the known sensitizing dyes. This quantity amounts to about 10 to 50 milligrams per 1 kg. of emulsion ready for being cast which contains about 9 per cent of gelatine, 4.5 per cent of silver halide, the rest being water. However, we do not wish to limit our invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast.

The dyes may likewise be added by bathing the finished photographic material in a bath in which the dye is dissolved. Such a treatment may be as follows: The photographic material to be sensitized is bathed in a solution containing 1 milligram of the dye, for instance, 1.1'-diethyl-bis-[3-ethyl-(tetrahydronaphtho-2'.1':4.5-thiazole)-(2)]-β-methyl-trimethinecyanine bromide in 100 cc. of an aqueous solution of methanol of 50 per cent strength for about 5 minutes. The material is then dried, whereupon it is ready for use.

The following examples serve to illustrate our invention:

*Example 1.*—p-Dimethylaminobenzylidene-[tetrahydronaphtho-2'.1':4.5-thiazole-(2)] ethiodide corresponding with the formula

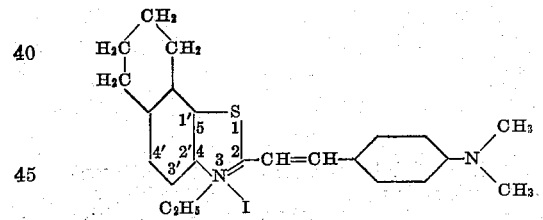

2 grams of 2-methyl-6.7-tetramethylene benzthiazole ethiodide and 0.84 gram of p-dimethylaminobenzaldehyde are boiled under reflux with 3 drops of piperidine and 15 cc. of ethyl alcohol. After recrystallization the pure dye melts at 268° C.

The alcoholic solution of the dye has an absorption maximum at a wave length of about 530μμ.

Incorporated in a silver bromide emulsion containing about 2 per cent of silver iodide, the dye imparts to it a range of sensitiveness from about 410 to 635μμ with a maximum at about 575μμ.

*Example 2.*—Bis-[3-ethyl-(tetrahydronaphtho-2'.1':4.5-thiazole)-(2)]-trimethinecyanine iodide corresponding with the formula

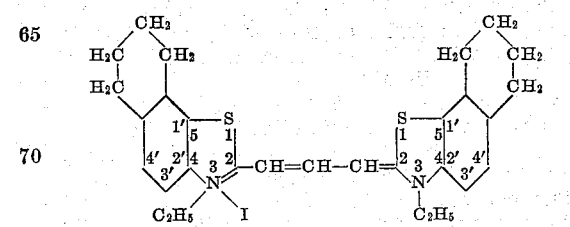

29 grams of 2-methyl-6.7-tetramethylenebenzthiazole ethiodide are boiled with 30 cc. of triethylortho-formate and 300 cc. of pyridine for about 3 hours. After distilling off the solvent and recrystallizing the residue from methanol the pure dye melts at 287° C.

The alcoholic solution of the dye has an absorption maximum at a wave length of about 570μμ.

Incorporated in a silver bromide emulsion containing about 4 per cent of silver iodide, the dye imparts to it a range of sensitization from about 510 to 650μμ with a maximum at about 605μμ.

*Example 3.*—Bis-[3-ethyl-(tetrahydronaphtho-2'.1':4.5-thiazole)-(2)]-β-methyl-trimethinecyanine iodide corresponding with the formula

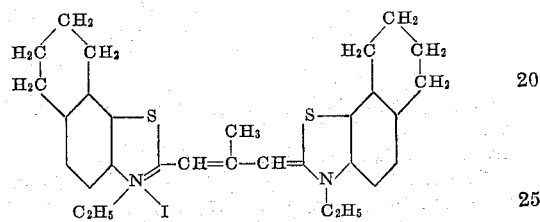

44 grams of 2-methyl-4.5-tetramethylenebenzthiazole and 44 grams of the ethyl ester of p-sulfotoluenic acid are heated for 7 hours to 180 to 190° C. Hereafter there are added 60 grams of triethylorthoacetate and 400 grams of pyridine. The mixture is boiled for about 3 hours. After the addition of an aqueous solution containing 37 grams of potassium iodide the solvent is distilled off. The dye is recrystallized from methanol and melts at 232° C.

The alcoholic solution of the dye has an absorption maximum at a wave length of about 560μμ.

Incorporated in a silver bromide emulsion containing about 4 per cent of silver iodide, the dye imparts to it a range of sensitization from about 490 to 660μμ with a maximum at about 590μμ.

*Example 4.*—Bis-[3-ethyl-(tetrahydronaphtho-1'.2':4.5-thiazole)-(2)]-β-methyl-trimethinecyanine iodide corresponding with the formula

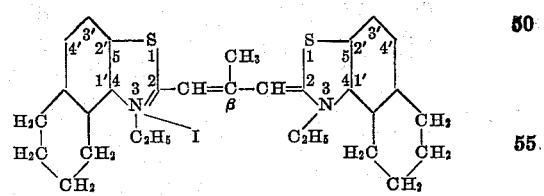

7.6 grams of 2-methyl-6.7-tetramethylenebenzthiazole and 7.4 grams of the ethylester of p-sulfotoluenic acid are heated for 3 hours to 140° C. The product of reaction is boiled with 15 grams of triethylorthoacetate and 250 cc. of pyridine for about 2 hours. Then a solution of 3 grams of potassium bromide are added, the pyridine is distilled off and the dye is recrystallized from a suitable solvent. It melts at 269° C.

The alcoholic solution of the dye has an absorption maximum at a wave length of about 555μμ.

Incorporated in a silver bromide emulsion containing about 4 per cent of silver iodide, the dye imparts to it a range of sensitization from about 490 to 670μμ with a maximum at about 605 to 545μμ.

*Example 5.*—Bis-[3-ethyl-(tetrahydronaphtho-1'.2':4.5-thiazole)-(2)]-β-methyl-trimethinecyanine iodide corresponding with the formula

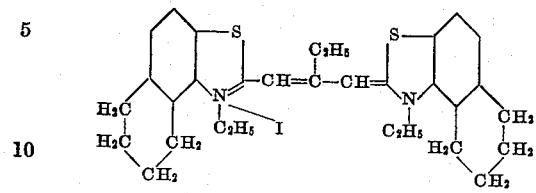

100 grams of 2-methyl-4.5-tetramethylenebenzthiazole and 100 grams of the ethyl ester of p-sulfotoluenic acid are heated for 6 hours to 180° to 190° C. The product of reaction is boiled with 120 grams of triethylorthopropionate and 2 cc. of pyridine for 2 hours. To the mixture there is added a solution of 30 grams of potassium iodide, the solvent is distilled off and the dye recrystallized from ethyl alcohol. It melts at 233° C.

The alcoholic solution of the dye has an absorption maximum at a wave length of about 560μμ.

Incorporated in a silver bromide emulsion containing about 2 per cent of silver iodide, the dye imparts to it a range of sensitization from about 500 to 650μμ with a maximum at about 590μμ.

*Example 6.*—Bis-[3-ethyl-(4'-ethoxy-tetrahydronaphtho-1'.2':4.5-thiazole)-(2)]-trimethinecyanine iodide corresponding with the formula

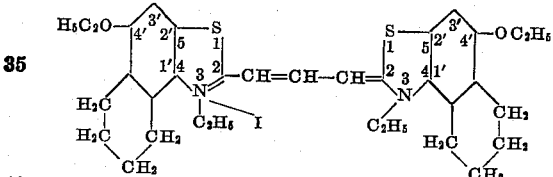

124 grams of 2-methyl-4.5-tetramethylene-6-ethoxy-benzthiazole and 100 grams of the ethyl ester of p-sulfo-toluenic acid are heated for 3 hours to 140° C. The product of reaction is boiled with 150 grams of triethylorthoformate and 2 cc. of pyridine for 2 hours. Hereon a solution of 100 grams of potassium iodide is added, the solvent distilled off and the dye recrystallized from alcohol. It melts at 265° C.

The alcoholic solution of the dye has an absorption maximum at a wave length of about 590μμ.

Incorporated in a silver bromide emulsion containing about 2 per cent of silver iodide, the dye imparts to it a range of sensitization from about 505 to 700μμ with a maximum at about 620μμ.

It is to be understood that our invention is not limited to the foregoing examples or to the specific details given therein. Numerous other embodiments are possible and we contemplate as included within our invention all such modifications and equivalents as fall within the scope of the appended claims.

What we claim is:

1. Bis-[3-ethyl-(tetrahydronaphtho-2'.1':4.5-thiazole)-(2)]-trimethinecyanine iodide.

2. Bis-[3-ethyl-(tetrahydronaphtho-1'.2':4.5-thiazole)-(2)]-β-methyl-trimethinecyanine iodide.

3. A dye corresponding with the formula

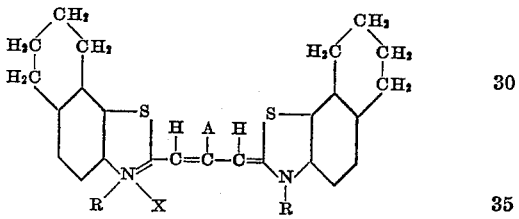

R and A stand for alkyl
X stands for an anion capable of precipitating the dye.

4. A bis-[3-alkyl-tetrahydronaphtho-thiazole-(2)]-trimethinecyanine salt.

WALTER DIETERLE.
KARL HORST.